United States Patent
Carrier et al.

(10) Patent No.: US 8,348,037 B2
(45) Date of Patent: Jan. 8, 2013

(54) SEALING PLUG FOR A TORQUE CONVERTER

(75) Inventors: John Carrier, Westfield, OH (US); Nathan Yensho, Norton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 291 days.

(21) Appl. No.: 12/824,844

(22) Filed: Jun. 28, 2010

(65) Prior Publication Data

US 2011/0005880 A1    Jan. 13, 2011

Related U.S. Application Data

(60) Provisional application No. 61/224,301, filed on Jul. 9, 2009.

(51) Int. Cl.
 *F16H 45/02*    (2006.01)
(52) U.S. Cl. .......................... 192/3.3; 29/428
(58) Field of Classification Search ............... 192/3.29, 192/3.3, 55.2, 55.6, 200; 277/634; 92/128; 29/428
See application file for complete search history.

(56) References Cited

U.S. PATENT DOCUMENTS

| | | | |
|---|---|---|---|
| 6,065,577 A * | 5/2000 | Arhab et al. | 192/3.29 X |
| 6,193,036 B1 | 2/2001 | Arhab et al. | |
| 6,948,602 B2 * | 9/2005 | Arhab et al. | 192/3.29 |
| 2009/0084649 A1 * | 4/2009 | Kombowski et al. | 192/3.29 |

FOREIGN PATENT DOCUMENTS

WO    2006018084 A1    2/2006

* cited by examiner

*Primary Examiner* — Gregory Binda
*Assistant Examiner* — Matthieu Setliff
(74) *Attorney, Agent, or Firm* — Simpson & Simpson, PLLC

(57) ABSTRACT

A torque converter having three sealed chambers in which a piston for engaging and disengaging a lock-up clutch is attached to the torque converter using a plurality of leaf springs. The assembly includes a plurality of access or pass-through holes for effecting the attachment of the leaf spring to the cover using rivets. Also included is plurality of plugs to seal the pass-through holes. A method of using the plugs to prevent uncontrolled leakage from one sealed chamber to another.

9 Claims, 4 Drawing Sheets

SEALING PLUG FOR A TORQUE CONVERTER

This application claims the benefit under 35 U.S.C. §119(e) of U.S. Provisional Application No. 61/224,301, filed Jul. 9, 2009.

FIELD OF THE INVENTION

The present invention relates to torque converters with multiple sealed chambers, more specifically to torque converters in which the piston is attached to the torque converter cover, and still more specifically to torque converters in which one or more leaf springs are used to attach the piston to the cover.

BACKGROUND OF THE INVENTION

Prior art torque converters are designed to allow the piston to move axially relative to the cover. Attachment of the piston to the cover by using a plurality of leaf springs provides the advantage of allowing greater fluxion of the fixedly attached piston. This will enable greater easier application of the clutch plate during the lock-up mode of torque converter operation.

Typically, leaf springs are attached to the piston and the cover using rivets. A problem is created when using rivets in that access to the rivet must be obtained on the side of the piston opposite from the cover. This requires an access or pass through hole in the piston that is aligned over the rivet-leaf spring assembly to enable attachment of the rivet to the torque cover. Thus, a hole is left which requires a seal in order to achieve the desired goal of creating multiple sealed chambers divided by a leak proof piston.

Thus, there is a need in the field for a device to seal the pass through holes used to gain access to the rivets used to attach a torque converter piston to the torque converter cover.

SUMMARY OF THE INVENTION

The present invention broadly comprises a torque converter having a cover shell; a piston for a lock-up clutch, the piston axially displaceable in the torque converter; a plurality of leaf springs, each of the leaf springs attached to the piston and the cover shell thereby attaching the piston to the cover shell; a reaction ring attached to the cover; a clutch plate positioned between the piston and the reaction ring; a cover plate attached to the clutch plate and extending to and attached to the hub of the turbine of the torque converter, such that the cover shell, the piston, the cover plate and the torque converter pump shell together form three separate fluid chambers within the torque converter; the torque converter comprising: a plurality of holes arranged in the piston, each of the plurality of holes aligned over an attachment point of one of the plurality of leaf springs and the piston; a plurality of plugs, one of the plurality of plugs fit into each one of the plurality of holes such that the wider opening of the hole is distal to the side of the piston facing the cover shell; wherein each of the plurality of plugs seals the alignment hole against outward pressure flow and inward pressure flow.

In a preferred embodiment, the walls of each of the plurality of holes are stepped and stepped plugs are used to fit into each of the holes.

The present invention also broadly comprises a method of preventing uncontrolled bidirectional movement of transmission fluid past a torque converter piston, the piston having a cover side facing a torque converter cover and a turbine side facing a turbine in the torque converter, the method comprising the steps of: extending a plurality of leaf springs between the piston and the cover for attachment to the piston and the cover; attaching the leaf springs to the piston; providing a plurality of pass through holes defined by the piston, each of the plurality of pass through holes aligned with one of the plurality of leaf spring-cover attachment points; pressing a plug into each of the pass through holes; sealing the outer edge of the piston against the torque converter cover or a component sealingly attached to the torque converter cover and the inner edge of the piston against a cover hub, the cover hub sealingly attached to the cover to form a first sealed chamber; and, forming a second sealed chamber between a clutch cover plate and the piston; wherein when transmission fluid pressure in the first chamber is greater than in the second chamber the pressed plugs prevent transmission fluid from moving from the first chamber to the second chamber; and, wherein when transmission fluid pressure in the second chamber is greater than in the first chamber, the pressed plugs prevent transmission fluid from moving from the second chamber to the first chamber.

One object of the invention is to provide a torque converter having a piston that operates to engage and disengage a clutch plate while attached to the torque converter cover.

A second object is to provide a piston configured to prevent uncontrolled flow of transmission oil between two sealed chambers.

A third object of the invention is to supply a method and devices to enable access to rivet attachment points through aligned pass through holes and plugs to allow rivets to be used to attach two components while preventing leakage of fluid through the pass through holes.

An additional object of the invention is to supply a method of preventing uncontrolled bidirectional flow of transmission between two sealed chambers in a torque converter.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures in which.

DETAILED DESCRIPTION OF PREFERRED EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
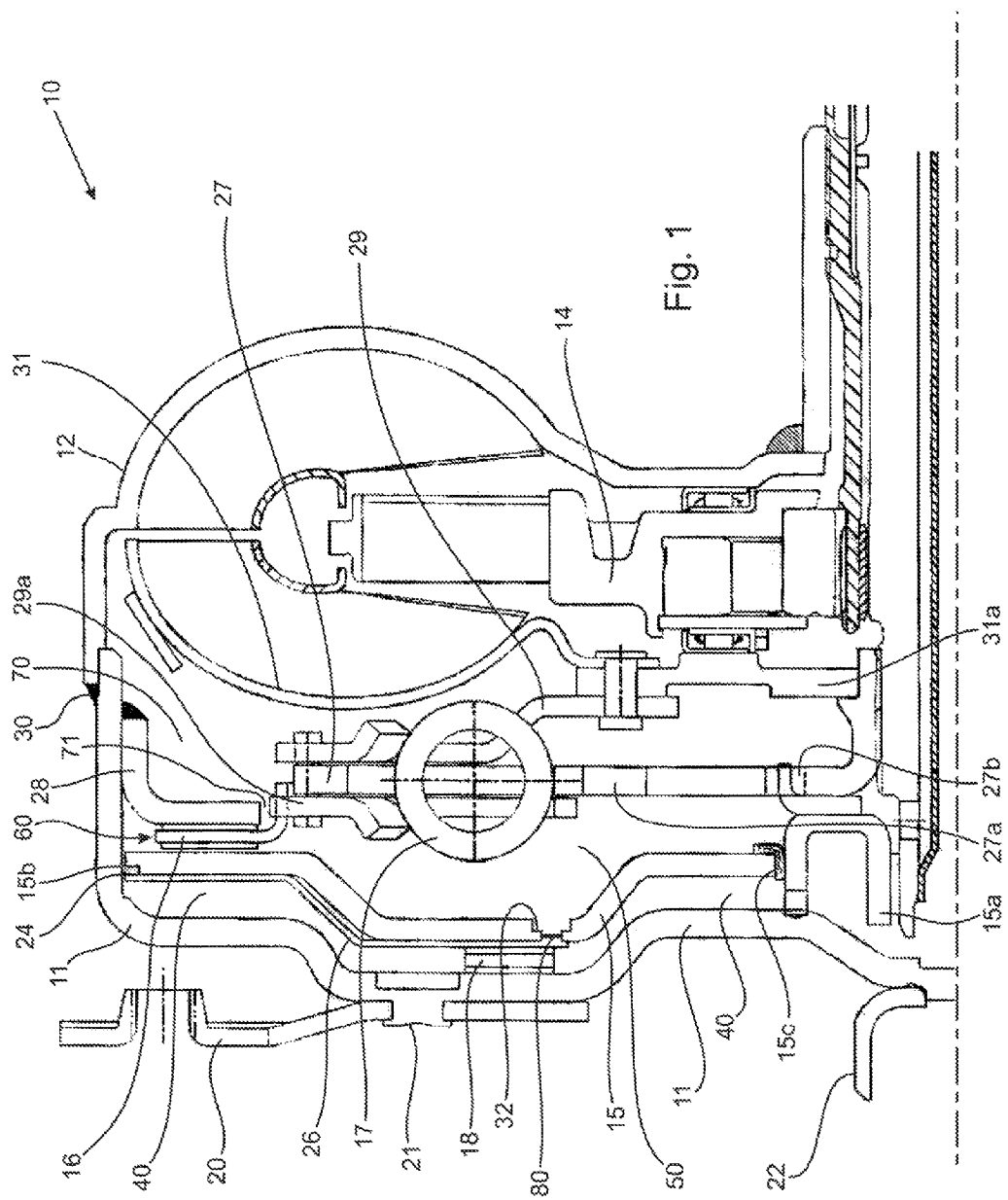
FIG. 1 is a cross section view of a three-pass torque converter utilizing the present invention.

Adverting to the drawings, FIG. 1 is a cross-sectional view of present invention torque converter 10. Cover 11 is attached to drive plate 20 by rivet 21. However, it should be understood that any means known in the art can be used to connect cover 11 to drive plate 20. Pilot 22 centers cover 11 in a crankshaft (not shown). Pilot 22 is made of sheet metal and may be formed by stamping using methods and materials known in the art to reduce cost. Pilot 22 is fixed to cover 11 using any means known in the art. In some aspects, pilot 22 is fixed to cover 11 by projection welding. In other aspects, pilot 22 is fixed to cover 11 by riveting (not shown). In some aspects, the pilot attachment rivet is an extruded rivet formed from cover 11. Pump shell 12 is fixed to cover 11 by weld 30. Torque converter 10 includes stator 14.

Piston plate 15 is sealed to the input shaft at bushing 15a using seal 15c. Piston plate 15 is further sealed to cover 11 with seal 24 positioned in coined area 15b of piston 15, and retained by sealed retainer plate 26. Retainer plate 26 may be attached to piston 15 using any means known in the art. In some aspects, retainer plate 26 is attached to piston 15 with extruded rivets (not shown.) In some aspects, seal 24 is a dynamic seal.

In a preferred embodiment, piston 15 is attached to cover 11 by a plurality of leaf springs 18. Piston 15 is flexible axially on either side of the attachment point with leaf spring 18 and lock-up clutch 60. Piston 15 also forms one wall of sealed chamber 40 and sealed chamber 50 and is displaceable in response to fluid pressure in chambers 40 and 50 to control the operation of lock-up clutch 60. For example, when the force on the piston 15 from fluid pressure in chamber 40 is greater than the force on piston 15 from fluid in chamber 50, piston 15 displaces, such as by flexion toward cover plate 29 to engage clutch 60. Conversely, in torque converter mode, fluid pressure in chamber 50 is greater than in chamber 40 and piston 15 flexes outwardly toward cover 11 and disengages from clutch 60.

Reaction ring 28 is bonded to cover 11. At least a portion of reaction ring 28 extends from cover 11 into a chamber of torque converter 10. Clutch plate 16 is sandwiched between reaction ring 28 and piston 15 to form clutch 60. Clutch plate 16 is attached to splined flange 27 which is substantially planer and extends radially in from clutch 60. Cover plates 29 and 29a are attached to flange 27 opposite from piston 15 and extends radially inward to turbine hub 31a. Cover plate 29 and turbine hub 31a are fixed to turbine shell 31. Cover plate 29 and turbine hub 31a along with piston 15 form sealed chamber 50, while cover plate 29, turbine hub 31a and pump shell 12 form chamber 70. Each chamber is charged with transmission fluid by means of its own path from the transmission.

During operation in torque converter mode, pressure in chamber 40 is lower than pressure in chamber 50. Therefore, piston plate 15 is pushed outwards, that is towards cover 11. In this mode, clutch plate 16 does not transmit torque. Oil flows from chamber 50 through orifice 71 and clearance hole 27a and washer hole 27b in flange 27 into chamber 70.

When torque converter clutch mode is desired, pressure in chamber 40 is increased so that piston 15 is urged inwards, that is towards clutch 60, clamping clutch plate 16 which transmits torque to cover plate 29. Because piston 15 is fixed to cover 11 by leaf springs 18, piston 15 must deflect toward clutch plate 16 and flange 27. The thickness of piston 15 may be varied to allow necessary deflection while keeping stress low for improved durability. Oil flows from chamber 50 through clutch plate(s) 16, through orifice 71 and clearance 27a and step washer hole 27b into chamber 70.

Figure 2:
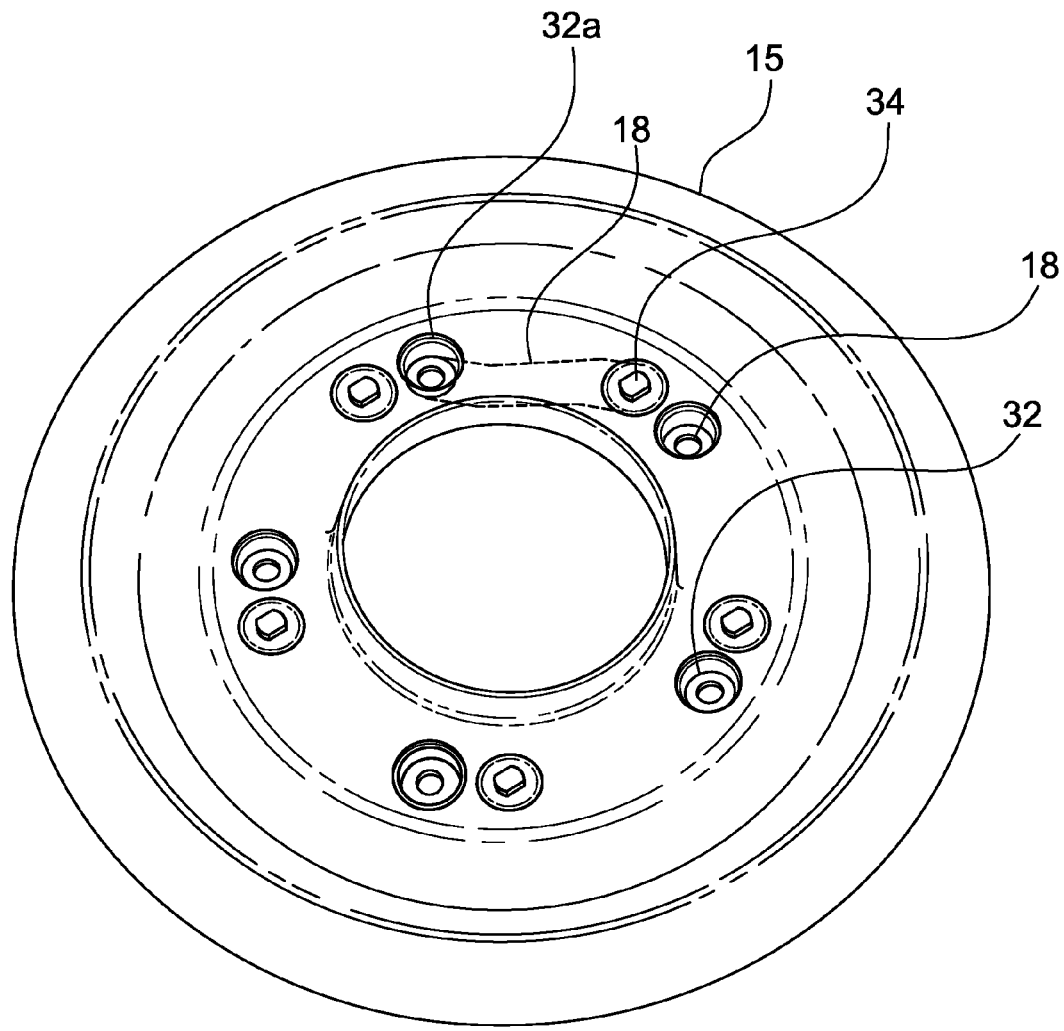
FIG. 2 is a top perspective view of a piston plate which defines pass through holes sized and shaped to receive the sealing plugs of the present invention.

FIG. 2 is a top perspective view of piston plate 15 showing a plurality of holes 32 in a circular pattern defined by piston plate 15. Holes 32 either receive and hold rivets 34 or enable an operator or worker to install rivets 34 to connect leaf spring 18 with cover 11. As viewed from FIG. 2, each hole 32 containing a rivet 34 is paired with empty hole 32 immediately clockwise from rivet 34. Leaf spring 18, seen at the bottom of hole 32, extends between one of one pair of holes 32 and the nearest hole of a neighboring pair of holes 32. This arrangement of leaf springs 18 is seen in FIG. 2 in which leaf spring 18 is shown in shadow extending between holes 32 from neighboring pairs of holes 32. One end of leaf spring 18 is connected by rivet 34 to piston 15 as seen in FIG. 2. The other end of leaf spring 18 is connected by a rivet, such as an extruded rivet formed in cover 11 (not seen) to cover 11 forming a fixed connection thereto with piston 15. Hole 32 aligned over the connection point with cover 11 provides the necessary access to rivet leaf spring 18 to cover 11. This arrangement allows an operator access to the extruded rivet or other type of rivet used to attach cover 11 to spring 18 through a hole such as hole 34 without the need for a more open environment. It will be recognized that rivets 34 used to connect leaf spring 18 to piston 15 may be different from the rivets 34 used to connect leaf spring 18 to cover 11.

Figure 3:
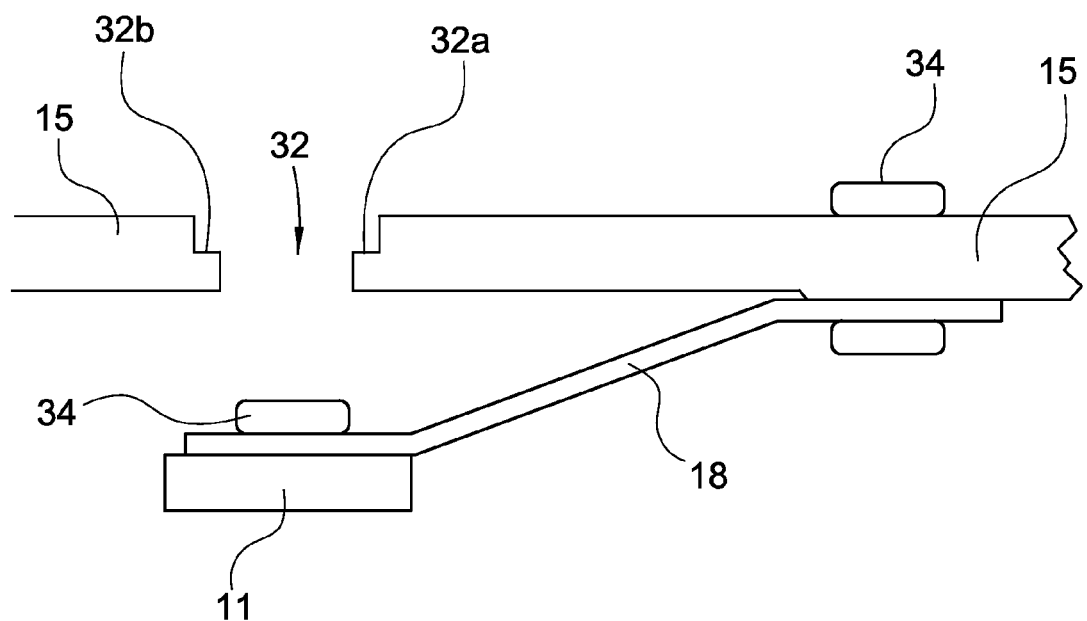
FIG. 3 is a schematic cross section showing the attachment of the torque converter piston to the cover using a leaf spring attached by rivets.

FIG. 3 is a schematic cross section showing the attachment of piston 15 to cover 11 by leaf spring 18. Leaf spring 18 is seen extended between rivets 34 that connect leaf spring 18 to both cover 11 and piston 15. Also seen is hole 32 aligned over rivet 34 at cover 11. Hole 32 reduces in circumference such that it has a larger opening on the side further or distal from cover 11 as compared to the side closest or proximal to cover 11 which is the opposite direction of clutch 16.

Figure 4:
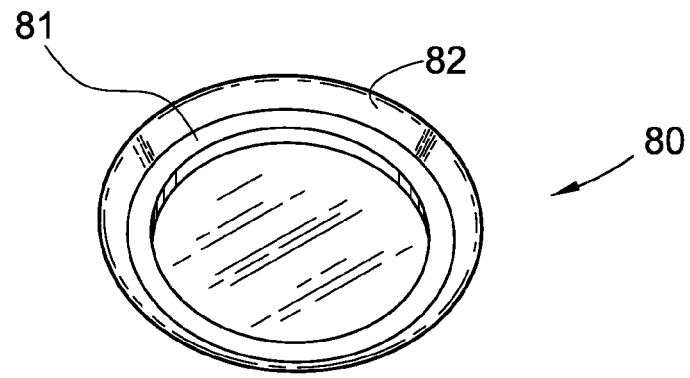
FIG. 4 is a top perspective view of a plug of the present invention used to seal pass through or access holes in the piston; and, FIG. 5 is a cross section view of the piston and sealing plug of the present invention with the plug placed into an access hole defined by the piston.

Persons of skill in the art will recognize that access holes 32 remain open after the rivets 34 are installed in cover 11. As noted above, piston 15 forms part of sealed chambers 40 and 50. In order to maintain the chambers in a sealed condition, holes 32 must be sealed to prevent leaks from one chamber into another. FIG. 4 is a top perspective view of plug 80 used to seal hole 32.

Figure 5:
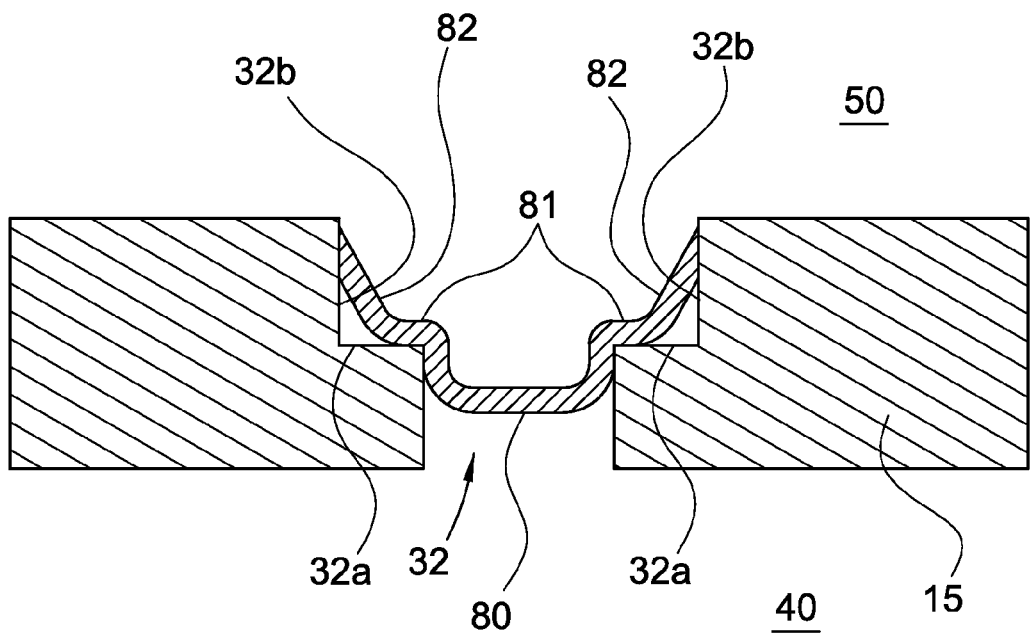

FIG. 5 is a schematic cross section view of piston 15 and plug 80 placed in hole 32 therein. FIG. 5 depicts a preferred embodiment in which the inner walls of hole 32 have a stepped configuration to form shoulder 32a. Plug 80 is preferably formed to include step 81 which rests on shoulder 32a. Wedging portion 82 of plug 80 extends along the wider portion 32b of hole 32. Plug 80 is preferably fabricated from cold-rolled steel of SAE 1074 grade although other materials may be used.

Plug 80 is pressed into hole 32 using methods know to those skilled in the art to create an interference fit of plug 80 in hole 32. Preferably a force of up to 14,000 N is used to press plug 80 into hole 32. In FIG. 5, it can be seen that piston 15 divides sealed chamber 40 from inner chamber 50. Plug 80 is placed into hole 32 such that the wider portion, including wedging portion 82, faces inner chamber 50 and the narrower portion below step 81 that extends across hole 32 faces outer chamber 40.

An unexpected advantage has been found with plug 80. As discussed above, in three chamber torque converter 10 of the present invention, either chamber 40 or chamber 50 may have greater fluid pressure than the other, causing piston 15 to flex axially either inwardly, toward clutch 60 or outwardly toward cover 11. The advantage pertains to the finding that plug 80 maintains the seal within hole 32 no matter which chamber is exerting the greater pressure thereby preventing fluid from inadvertently leaking between either of the two chambers.

Thus it is seen that the objects of the invention are efficiently obtained, although changes and modifications to the invention should be readily apparent to those having ordinary skill in the art, which changes would not depart from the spirit and scope of the invention as claimed.

We claim:

1. A torque converter, comprising:
   a cover;
   a turbine shell;
   a turbine hub fixed to the turbine shell;
   a piston for a lock-up clutch, said piston axially displaceable in said torque converter;
   a plurality of leaf springs, each leaf spring in the plurality of leaf springs attached to said piston and said cover thereby attaching said piston to said cover;
   a reaction ring formed from a first piece of material different from a second piece of material forming the cover, the reaction ring fixedly attached to said cover;
   a clutch plate positioned between said piston and said reaction ring;
   a cover plate attached to said clutch plate; and,
   a plurality of plugs, wherein:
      said cover, said piston, said turbine shell and said turbine hub form respective portions of first, second, and third separate fluid chambers within said torque converter;
      the piston includes a plurality of holes, each hole of said plurality of holes aligned over an attachment point of a respective spring from said plurality of leaf springs and said cover;
      each said plug seals said respective hole against outward pressure flow and inward pressure flow;
      a first fluid chamber is at least partially formed by the piston, the turbine shell, and the turbine hub;
      a second fluid chamber is at least partially formed by the piston and the cover; and,
      when pressure in the second chamber is greater than pressure in the first chamber, the piston displaces to close the lock-up clutch.

2. The torque converter as recited in claim 1 wherein said each hole has a step shoulder.

3. The torque converter as recited in claim 2 wherein said each plug comprises a stepped portion sized to fit against said step shoulder.

4. The torque converter as recited in claim 1 wherein said each plug is pressed into said respective hole at a force of up to about 14,000 N.

5. A method of preventing uncontrolled bidirectional movement of transmission fluid in a torque converter including a cover, a turbine shell, a pump shell, a cover hub attached to the cover, a lock-up clutch with a piston, a plurality of leaf springs, and a reaction ring formed from a first piece of material different from a second piece of material forming the cover, the reaction ring fixedly attached to said cover, said method comprising the steps of:
   extending the plurality of leaf springs between said piston and said cover;
   attaching said plurality of leaf springs to said piston and said cover;
   providing a plurality of pass through holes defined by said piston, each of said plurality of pass through holes aligned with an attachment point for a respective leaf spring from the plurality of leaf springs to the cover;
   pressing a respective plug into each pass through hole from the plurality of pass through holes;
   sealing an outer edge of said piston against said torque converter cover or a component sealing attached to said torque converter cover;
   sealing an inner edge of said piston against the cover hub
   forming at least a portion of a first sealed chamber with the piston, the cover hub and the turbine shell;
   forming a second sealed chamber between the cover and said piston;
   forming at least a portion of a third chamber with the turbine shell and the pump shell;
   when transmission fluid pressure in said first chamber is greater than in said second chamber preventing, with the respective pressed plugs, transmission fluid from moving from said first chamber to said second chamber; and,
   when transmission fluid pressure in said second chamber is greater than in said first chamber, preventing, with the respective pressed plugs, transmission fluid from moving from said second chamber to said first chamber.

6. The method of claim 5 wherein at least one of said plurality of pass through holes includes a stepped shoulder around the circumference of the wall of said at least one of said plurality of pass through holes stepped such that the wider opening of said at least one pass though hole faces the turbine shell.

7. The method of claim 5 wherein at least one of said plugs is a stepped plug.

8. The method of claim 5 wherein pressing a respective plug into each pass through hole includes pressing with a force of up to about 14,000 N.

9. A torque converter, comprising:
   a cover;
   a pump shell connected to the cover such that rotation of the pump shell is locked to rotation of the cover;
   a turbine shell;
   a lock-up clutch including:
      an axially displaceable piston;
      a plurality of leaf springs, each leaf spring attached to the piston and the cover;
      a reaction ring:
         consisting of a first piece of material different from a second piece of material for the cover; and,
         welded to the cover;
   a first fluid chamber at least partially formed by the cover and the piston;
   a second fluid chamber at least partially formed by the piston and the turbine shell; and,
   a third fluid chamber at least partially formed by the turbine shell and the pump shell, wherein:

the piston includes a plurality of holes, each hole axially aligned with a respective attachment point for a leaf spring from the plurality of leaf springs to the cover;

the piston includes a plurality of plugs, each plug engaged with a respective hole from the plurality of holes such that said each plugs seals the respective hole against outward pressure flow and inward pressure flow; and, when pressure in the first chamber is greater than pressure in the second chamber, the piston displaces to close the lock-up clutch.

* * * * *